United States Patent
Krauss

(10) Patent No.: US 10,146,853 B2
(45) Date of Patent: Dec. 4, 2018

(54) DETERMINING ENTITY RELATIONSHIP WHEN ENTITIES CONTAIN OTHER ENTITIES

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 14/713,884

(22) Filed: May 15, 2015

(65) Prior Publication Data

US 2016/0335341 A1    Nov. 17, 2016

(51) Int. Cl.
*G06F 7/00* (2006.01)
*G06F 17/30* (2006.01)

(52) U.S. Cl.
CPC .. *G06F 17/30598* (2013.01); *G06F 17/30507* (2013.01)

(58) Field of Classification Search
None
See application file for complete search history.

(56) References Cited

U.S. PATENT DOCUMENTS

| 2002/0174124 A1* | 11/2002 | Haas ................. G06F 17/30241 |
| 2003/0212705 A1 | 11/2003 | Williamson et al. |
| 2007/0067285 A1 | 3/2007 | Blume |
| 2008/0319978 A1 | 12/2008 | Brun et al. |
| 2009/0077079 A1 | 3/2009 | Rettinger et al. |
| 2009/0144299 A1* | 6/2009 | Ledwith ............ G06F 17/30315 |
| 2009/0319515 A1 | 12/2009 | Minton |
| 2011/0047167 A1* | 2/2011 | Caceres ................. G06Q 10/10 707/749 |

(Continued)

FOREIGN PATENT DOCUMENTS

| GB | 002513472 A | 10/2014 |
| WO | WO 2005050491 A1 | 6/2005 |
| WO | WO2009086312 A1 | 7/2009 |

OTHER PUBLICATIONS

Alex, Beatrice, et al;. "Recognising nested named entities in biomedical text." In Proceedings of the Workshop on BioNLP 2007: Biological, Translational, and Clinical Language Processing, pp. 65-72. Association for Computational Linguistics, 2007.

(Continued)

*Primary Examiner* — Tuan A Pham
(74) *Attorney, Agent, or Firm* — Patterson + Sheridan, LLP

(57) ABSTRACT

The present disclosure relates to entity resolution (i.e., determining "is a" and "is related to a" relationships between entities) in an entity analytics system. According to one embodiment, an entity analytics system specifies a plurality of entity classes. Entities of a first entity class can contain entities of at least a second entity class. The entity analytics system specifies one or more features characterizing each of the plurality of entity classes. At least one of the features indicates that entities of the second entity class can be included as a feature of entities of the first entity class. The entity analytics system resolves two entities of the at least the second entity class as identical based on common features shared by the two entities and determines that at least two entities of the first entity class containing the resolved entity are identical.

18 Claims, 5 Drawing Sheets

(56) References Cited

U.S. PATENT DOCUMENTS

| | | | | |
|---|---|---|---|---|
| 2011/0264651 A1* | 10/2011 | Selvaraj | ............ | G06F 17/30867 |
| | | | | 707/723 |
| 2012/0089606 A1* | 4/2012 | Eshwar | ............ | G06F 17/30539 |
| | | | | 707/737 |
| 2015/0052154 A1* | 2/2015 | Krauss | ................ | G06F 17/3053 |
| | | | | 707/749 |

OTHER PUBLICATIONS

Prévost, Guillaume, et al; "Ecosystem complexity described with ontological tool for a multi-scale, multi-model approaches in distributed environment." In Jordan International Conference on Computer Sciences and Engineering, Al-Salt, Jordan. 2004.

Bhattacharya, Indrajit and Getoor, Lise; "A Latent Dirichlet Model for Unsupervised Entity Resolution"; SIAM International Conference on Data Mining (2006).

Bhattacharya, Indrajit and Getoor, Lise; "Relational Clustering for Multi-type Entity Resolution"; ACM SIGKDD Workshop on Multi Relational Data Mining (MRDM)—2005.

Bhattacharya, Indrajit and Getoor, Lise; "Entity Resolution in Graphs"; Technical Reports of the Computer Science Department; Oct. 27, 2005.

* cited by examiner

DETERMINING ENTITY RELATIONSHIP WHEN ENTITIES CONTAIN OTHER ENTITIES

BACKGROUND

The present invention relates to entity analytics, and more specifically, to determining relationships between entities in an entity analytics system.

Entity analytics systems typically are configured to determine relationships between entities, such as "is a" or "is related to a" relationships. An "is a" relationship exists between two observed entities if the observations reflect an identical entity (i.e., two observations refer to the same entity). Using a ship tracking system as an example, if two observations of oceangoing vessels reflect common positions, crew members, tonnage, registration numbers, etc., the system determines that there is a 1:1 relationship (i.e., an "is a" relationship) between the two entities. An "is related to a" relationship exists between two observed entities if the observations reflect sufficiently common characteristics, but not an exact match. Again, using a ship tracking system as an example, an "is related to" relationship exists between entities, for example, if two observed entities have similar tonnages, but different positions, crew members, etc.

Typically, entity analytics systems are configured to determine "is a" and "is related to a" relationships between different entities using an entity/feature/feature element model. In the entity/feature/feature element model, an entity may have one or more features, and each feature may have a set of pre-defined elements. Using a ship tracking system as an example, the entity itself may be a ship. The ship may have a plurality of features, such as ship size, crew information, identifying information, and so on. The ship size information could have feature elements corresponding to the maximum tonnage, volume, and so on. The crew information feature could have feature elements corresponding to specific positions on the ship (e.g., captain, helmsman, navigator, etc.). The identifying information could have feature elements corresponding to a registration number, port of registry, and so on.

An entity analytics system may determine "is a" and "is related to a" relationships using the entity/feature/feature element model. However, entity resolution using the entity/feature/feature element model may be limited in depth and breadth. Entity resolution using the entity/feature/feature element model also may not consider a case where an entity contains another entity. For example, since, in the entity/feature/feature element model, an entity may not contain another entity, resolution of an entity may miss significant opportunities for resolution of a super-entity.

SUMMARY

One embodiment disclosed herein includes a method for performing entity resolution in an entity analytics system. The method generally includes specifying a plurality of entity classes, wherein entities of a first entity class can contain entities of at least a second entity class. The entity analytics system specifies one or more features characterizing each of the plurality of entity classes, wherein at least one of the features indicates that entities of the second entity class can be included as a feature of entities of the first entity class. Two observed entities of the at least the second entity class are resolved as identical based on common features shared by the two observed entities. Based on that resolution, the entity analytics system determines that at least two observed entities of the first entity class are identical.

Another embodiment includes a computer-readable storage medium having instructions, which, when executed on a processor, performs an operation for maintaining consistency in a content management system. The operation generally includes specifying a plurality of entity classes, wherein entities of a first entity class can contain entities of at least a second entity class. The entity analytics system specifies one or more features characterizing each of the plurality of entity classes, wherein at least one of the features indicates that entities of the second entity class can be included as a feature of entities of the first entity class. Two observed entities of the at least the second entity class are resolved as identical based on common features shared by the two observed entities. Based on that resolution, the entity analytics system determines that at least two observed entities of the first entity class are identical.

Still another embodiment includes a processor and a memory storing a program, which, when executed on the processor, performs an operation for maintaining consistency in a content management system. The operation generally includes specifying a plurality of entity classes, wherein entities of a first entity class can contain entities of at least a second entity class. The entity analytics system specifies one or more features characterizing each of the plurality of entity classes, wherein at least one of the features indicates that entities of the second entity class can be included as a feature of entities of the first entity class. Two observed entities of the at least the second entity class are resolved as identical based on common features shared by the two observed entities. Based on that resolution, the entity analytics system determines that at least two observed entities of the first entity class are identical.

DETAILED DESCRIPTION

Figure 1:
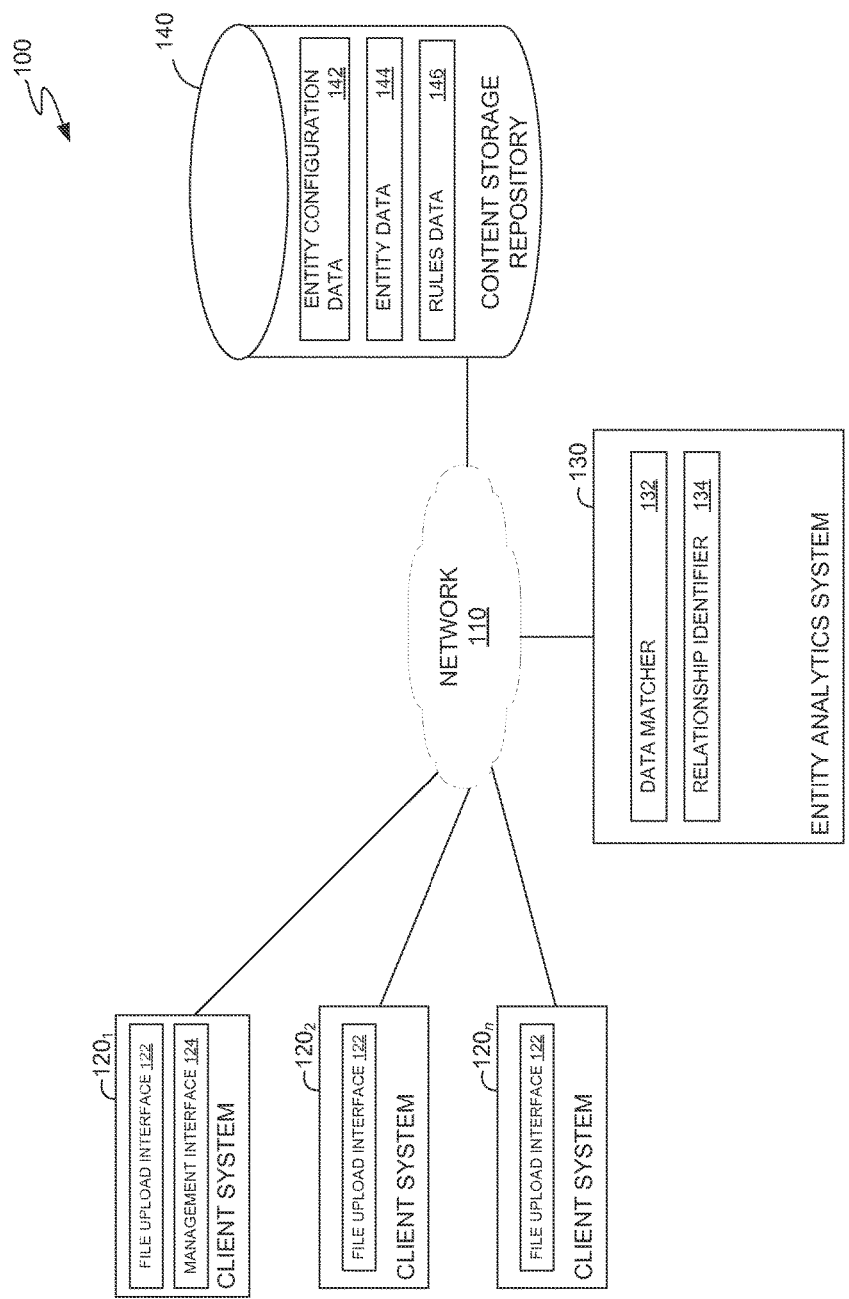
FIG. 1 illustrates an example of a networked computing environment, according to one embodiment.

Embodiments presented herein describe techniques for performing entity resolution in an entity analytics system using a model where entities may contain other entities. Entity resolution generally includes analyzing observed entity data inbound to the entity analytics system to determine "is a" and "is related to a" relationships between observed entities. By using a model supporting super-entities containing sub-entities, the entity analytics system may perform entity resolution at a sub-entity level and use relationships determined at the sub-entity level to determine relationships between super-entities containing the sub-entities. When super-entities can contain sub-entities, "features" in the entity/feature/feature element model can be sub-entities of a parent entity, and feature elements in the entity/feature/feature element model can be sub-entities of a feature entity. When the entity analytics system performs entity resolution, the entity analytics system determines "is a" and "is related to a" relationships between entities.

In one embodiment, an entity may be configured to support any number of sub-entities. While an entity analytics system may determine entity relationships using the "has a" relationships between super-entities and sub-entities, each entity may act as either a super-entity, or a sub-entity, or both. Thus, each entity may contain a number of features, which in turn may contain a number of feature elements, where any of these features and feature elements may be an entity in its own right. Using a ship tracking system as an example, a vessel could be the highest-level super-entity and have a number of crew members (a sub-entity). Each crew member could have an address, which could have a number of typical household objects (e.g., ovens, microwaves, etc.), which could each have a number of unique components. Each component could have data such as manufacture date, a serial number, and so on, either as sub-entities or as entity features that are not themselves entities.

Entity resolution at one level may facilitate entity resolution at different levels. For example, an entity analytics system may use entity resolution at a sub-entity level to resolve super-entities. Using the ship tracking system again as an example, a determination that two crew member entities (sub-entities) associated with different observations of ships (the super-entities) actually refer to an identical crew member can be used to determine that the two ship entities refer to an identical ship. Likewise, an entity analytics system can use entity resolution at the super-entity level to resolve sub-entities. For example, using the ship tracking system again, if the entity analytics system determines that two ships (super-entities) are identical, the entity analytics system can determine that sub-entities, such as an entity (e.g., an oven) belonging to a crew member of the ship, are identical.

Advantageously, using entities containing other entities for entity resolution allows an entity analytics system to determine relationships between entities at any level of entity of sub-entity. Based on relationships determined at one entity level, an entity analytics system can determine relationships of sub-entities and super-entities relative to the resolved entity. Additionally, using "has a" relationships between super-entities and sub-entities, an entity analytics system can determine that a collection of related entities comprises a new entity or that entities that share a sub-entity are related by the sub-entity.

FIG. 1 illustrates an example computing environment, according to one embodiment. As shown, the computing environment includes a plurality of client devices 120, an entity analytics system 130, and a data store 140, connected to a network 110.

Each of the plurality of client devices 120 allow a user to access an entity analytics system 130 and to view aspects of the entities and relationships between entities stored in data store 140. Each client device includes a data viewer 122. Data viewer 122 allows a user to view information (i.e., an entity's sub-entities, features, etc.) about an entity stored in data store 140 and relationships between entities as determined by entity analytics system 130. When unanalyzed data (i.e., inbound data) is ingested into entity analytics system 130, the entity analytics system considers each inbound entity as an observation of the entity. For each observation, entity analytics system 130 may attempt to resolve the entity as identical to previously tracked entities and/or determine relationships between an observed entity and previously tracked entities. Some client devices 120 may include a management interface 124. Through management interface 124, system administrators can view and modify data in entity configuration data store 142, entity data store 144, and rules store 146 used for determining relationships between different entities stored in data store 140.

As illustrated, entity analytics system 130 includes a data matcher 132 and a relationship identifier 134. Data matcher 132 is generally configured to monitor for unanalyzed entity data (i.e., inbound data) stored in data store 140. Data matcher 132 may treat each unanalyzed entity as an observation of the entity. If data matcher 132 detects unanalyzed data, data matcher 132 may search for all entities in the entity analytics system (e.g., stored in entity data store 144) that contain an observed entity or feature. If data matcher 132 finds matching entities in the entity analytics system, data matcher 132 can trigger the relationship identifier 134 to analyze possible relationships between the matching entities and perform entity resolution of super-entities based on the matching entities.

Relationship identifier 134 is generally configured to receive a collection of matching entities from data matcher 132 and to examine super-entities and sub-entities to determine whether entities are unrelated, partial matches (i.e., two entities have an "is related to a" relationship), or exact matches (i.e., two entities have an "is a" relationship). To determine whether a relationship exists between two entities, relationship identifier 134 can examine sub-entities belonging to each matching entity. If relationship identifier 134 determines that two super-entities do not contain any matching sub-entities, relationship identifier 134 can determine that the two super-entities are not related.

Relationship identifier 134 can use rules defining a threshold number of matching sub-entities to determine whether super-entities have an "is a" or an "is related to a" relationship. For example, if all sub-entities belonging to a first super-entity match all sub-entities belonging to a second super-entity, relationship identifier 134 can determine that the first and second super-entities are identical (i.e., have an "is a" relationship). If the number or proportion of matching sub-entities between two super-entities falls below a threshold value, relationship identifier 134 can determine that the first and second super entities are related to each other but are not identical entities (i.e., the first and second entities have an "is related to a" relationship). In some cases, to account for inconsistencies in data that actually represents the same information (e.g., two mailing address entries, one using full street names and the other using abbreviations; phone numbers formatted using periods versus spaces; etc.), "fuzzy" matching can be used to determine whether two entities are identical or related entities.

Using a ship tracking system again as an example, data matcher 132 could detect an unanalyzed observation of a crew member and find analyzed entities matching the unanalyzed observation of the crew member. Data matcher 132 could find any number of previously observed entities that potentially represent an identical crew member; in this example, we assume that data matcher 132 finds one such matching crew member. Data matcher 132 provides the two crew members to relationship identifier 134, and relationship identifier 134 analyzes each of the sub-entities to determine whether or not the entities are related. Assuming that in this model, each crew member has an address, each address has a number of household objects (e.g., ovens), and each household object has a number of components with unique serial numbers, relationship identifier 134 can determine that the two crew members are identical if both crew members have the same address, with the same household objects, and the household objects associated with the address have the same components with the same serial numbers. Based on the determination, and prospectively on other factors, in some embodiments relationship identifier 134 can further determine that the super-entities (i.e., the entities representing the vessels on which the crew member has been observed) are identical.

Relationship identifier 134 may use relationships determined between super-entities to determine relationships between sub-entities. For example, if, in a ship tracking system, relationship identifier 134 determines that two vessels are identical, relationship identifier 134 can determine that two household objects belonging to crew members with the same name, address, etc. are identical.

Data store 140 may be a database and may contain information used in entity analytics system 130. Data store 140 may include an entity configuration data store 142, an entity data store 144, and rules store 146.

Entity configuration data store 142 may include a plurality of entries defining classes of entities in the entity analytics system. An entity definition may include information indicating whether the entity can be a container for other entities (i.e., whether the entity can contain sub-entities). If the entity definition indicates that the entity may contain other entities, the entity definition may further include information indicating the classes of entities that the entity can include as sub-entities. The entity definition may further include information used to identify the entity, such an entity class name, an identifier, etc. In some embodiments, an entity definition may further include a list of features that the entity can have and a corresponding list of feature elements for each feature. Since entities of certain classes may contain other entities, the "has a" relationships between super-entities and sub-entities may descend hierarchically through any number of levels, terminating (if at all) with an entity that may not contain any other entities (i.e., a sub-entity that may not be a super-entity to other entities).

Entity data store 144 contains records for each entity stored in the entity analytics system. Each entity stored in entity data store 144 may be associated with an entity class definition from entity configuration data store 142. Based on the associated entity class definition, the entity may include references to a number of sub-entities, the types of which correspond to the classes of sub-entities that the entity may contain. For example, the references to sub-entities may comprise a list of unique identifiers associated with the sub-entities. Each entity may additionally include information identifying the entity (e.g., a unique identifier, name, etc.), as well as lists of features and feature elements associated with the entity.

Rules store 146 contains information that entity analytics system 130 may use to determine relationships between different entities, according to some embodiments. Information stored in rules store 146 may correspond to an entity class stored in entity configuration data store 142. For example, if an entity class defines a phone number, a corresponding rule may indicate that a plurality of phone number formats should be interpreted as the same phone number format. In the case of a U.S. or Canadian phone number, a rule may thus indicate that, for the purposes of determining whether two phone numbers are the same, a leading "+1" and non-numerical characters may be stripped from phone number entries before entity analytics system 130 determines whether or not the two phone numbers are the same and analyzes super-entities for "is a" and "is related to a" relationships based on a matching phone number. Similar rules may be added for other phone number formats. As entity classes are added to entity configuration data store 142, one or more corresponding rules for an entity class may be added to rules store 146.

Figure 2:
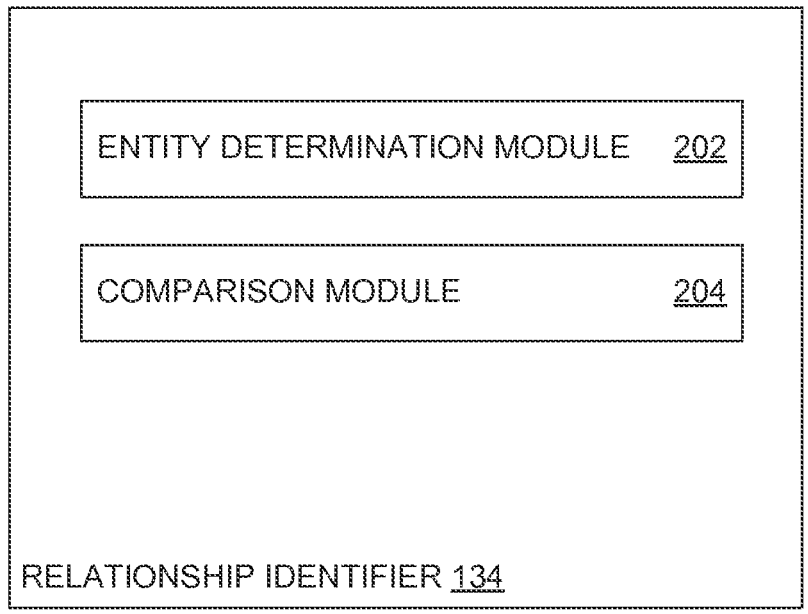
FIG. 2 is a block diagram illustrating an example relationship identifier, according to one embodiment.

FIG. 2 illustrates an example block diagram of a relationship identifier 134, according to some embodiments. As illustrated, relationship identifier 134 may include an entity determination module 202 and a comparison module 204.

Entity determination module 202 may receive a set of entities from data matcher 132 that includes the observed entity (i.e., an inbound entity) and one or more matching entities. For each entity in the set received from data matcher 132, entity determination module 202 may search for super-entities and sub-entities in entity data store 144. After entity determination module 202 retrieves a set of super-entities and sub-entities for each entity received from data matcher 132, comparison module 204 may examine each set to determine whether two entities are related or not.

For each observed entity, comparison module 204 may retrieve rules corresponding to the entity class from rules store 146 and search for a matching sub-entity associated with other entities. In some embodiments in which an entity may have multiple sub-entities, if comparison module 204 detects any matching sub-entities associated with an observed entity and a second entity, comparison module 204 may increment a counter for tracking the number of matching sub-entities detected between the observed entity and the second entity.

In one embodiment, after comparison module 204 compares the sub-entities associated with the observed entity and the second entity, comparison module 204 uses the counter to determine whether the observed entity and the second entity are related. If comparison module 204 found no matches between sub-entities associated with the observed entity and the second entity (i.e., the counter value is 0), comparison module 204 may determine that no relationship exists between the observed entity and the second entity. If comparison module 204 finds an exact match (i.e., the counter value equals the number of sub-entities) between the first and second entities, comparison module 204 may determine that the observed entity and the second entity are identical (i.e., that an "is a" relationship exists between the observed entity and the second entity). Whether or not a counter for matching sub-entities is used, if comparison module 204 finds some matching sub-entities, but not an exact match, comparison module 204 may determine that an "is related to a" relationship exists between the observed entity and the second entity. The rules may indicate that all, or only portion, of sub-entities must match in order for super-entities to be deemed identical. The rules may indicate which sub-entities must match and the degree to which they must match, for a given entity class, in order for super-entities to be deemed unrelated, related, or identical. The rules may further indicate other entity features, which are not themselves entities, must match, and to which degree. In some embodiments, other criteria also may be made part of the entity matching rules, such as the number of allowable observed occurrences of an entity per sub-entity or feature (i.e., "frequency") to qualify as a match, the number of allowable observed occurrences of a sub-entity or feature per entity (i.e., "exclusivity") to qualify as a match, or any other matching criteria not contradictory to the spirit of the invention.

As discussed above, if comparison module 204 determines that a first and a second entity are related to each other (e.g., the first and second entities are identical, or are not identical but are otherwise related to each other), comparison module 204 may examine the first and second entities' super-entities in an attempt to resolve relationships between super-entities based on relationships among sub-entities. Again, using the ship tracking system example, if comparison module 204 determines that two crew member entities are identical based on matching addresses, household objects, household object components, and serial numbers, comparison module 204 can determine that the super-entities (e.g., the ships) associated with each of the crew member entities at a given time are also identical.

Figure 3:
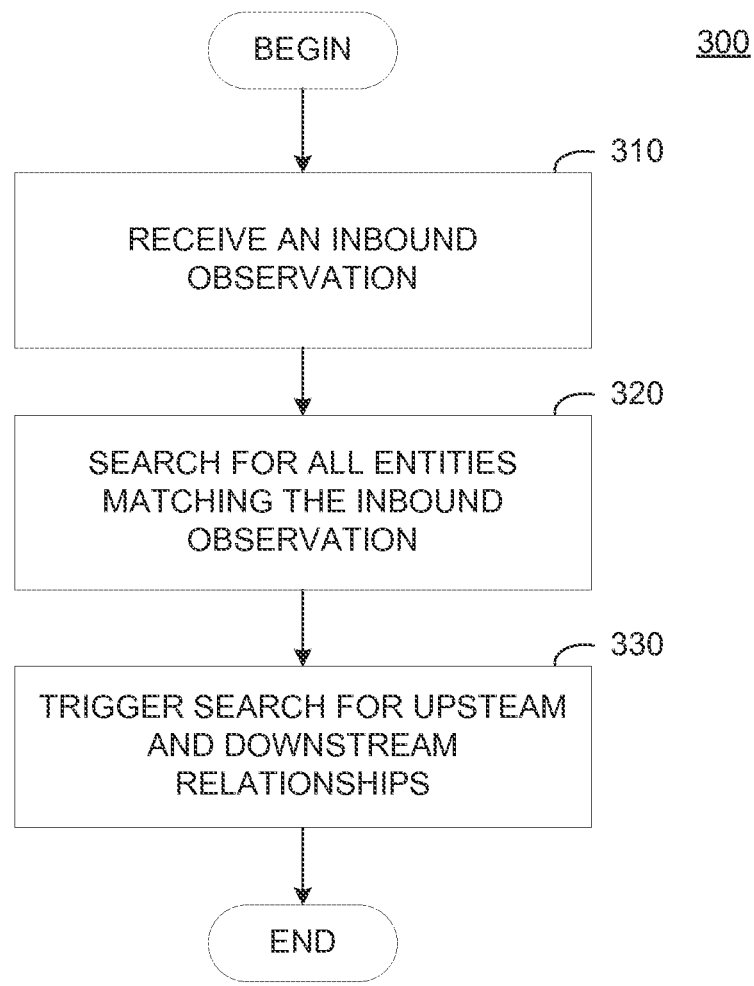
FIG. 3 illustrates a method for searching for entities in an entity analytics system, according to one embodiment.

FIG. 3 illustrates an example method 300 that may be performed by an entity analytics system to select a set of entities for entity resolution, according to one embodiment. As shown, method 300 begins at step 310, where the entity analytics system receives an inbound observation. The entity analytics system may receive the input from a client system 120 via data transmitted over a web interface (e.g., using HTTP POST) or using an API of the entity analytics system.

At step 320, the entity analytics system determines entities matching the inbound observation. To do so, the entity analytics system may transmit a query to data store 140. The entity analytics system may receive all or part of entity data 144 in a set of results from data store 140, including the set of entities matching the inbound observation. In some cases, the query may be used to find all entities that contain a particular sub-entity; in other cases, the query may be used to find all entities that match any set of features, feature elements, or other parameters as determined by the entity analytics system. The entity analytics system may determine the set of features, feature elements, or other parameters according to rules in rules data 146 and/or by other means. If the set of results returned from data store 140 is empty (e.g., the NULL set), the method may end. Otherwise, method 300 proceeds to step 330, where the entity analytics system determines upstream and downstream relationships to perform entity resolution (i.e., examines relationships between an observed entity and its super-entities and sub-entities, respectively).

Figure 4:
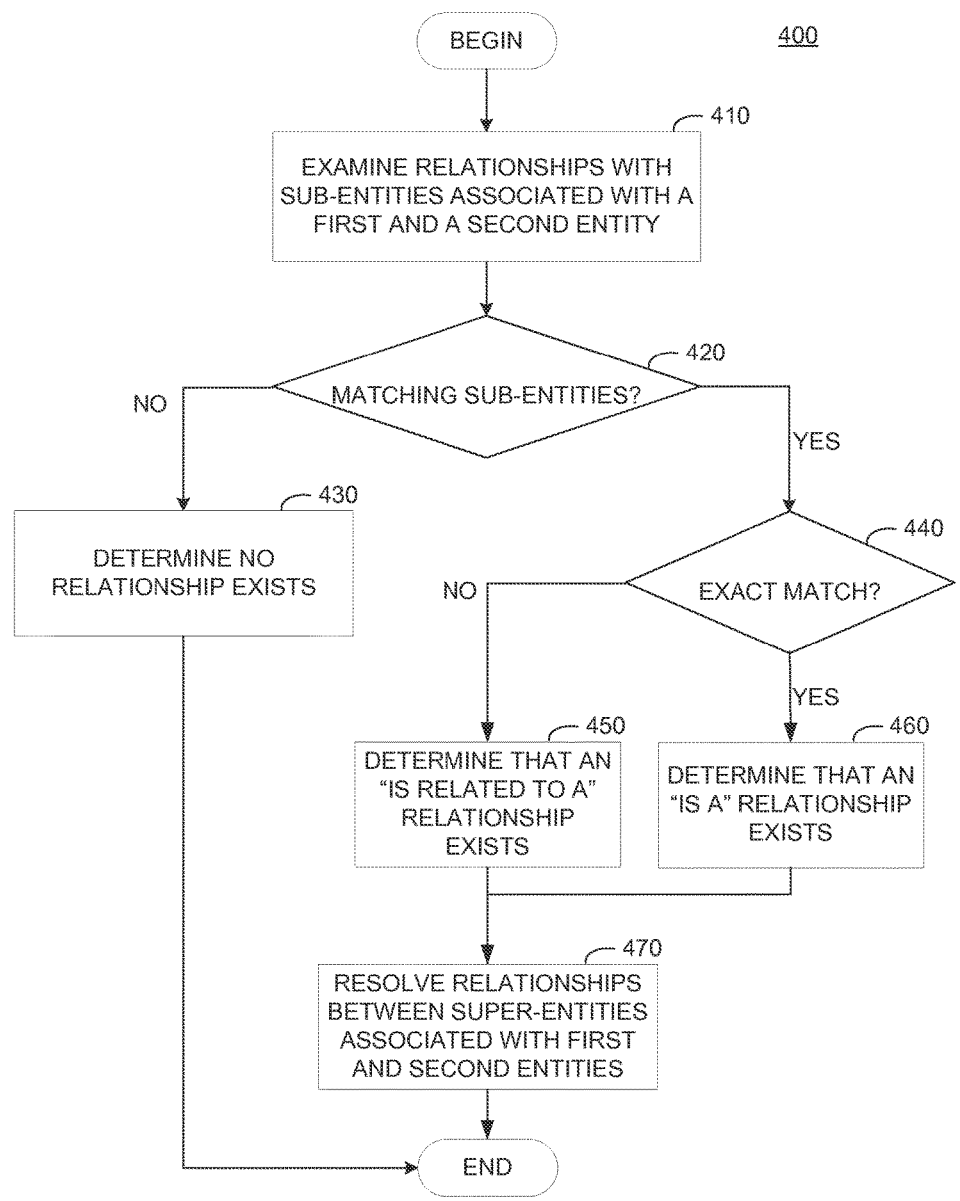
FIG. 4 illustrates a method for determining whether two entities are related, according to one embodiment.

FIG. 4 illustrates an example method 400 for performing entity resolution based on a set of observed entities, according to one embodiment. Method 400 begins at step 410, where the entity analytics system examines upstream and downstream relationships with other entities. As discussed above, for each observed entity for which relevant data is passed into method 400, the entity analytics system queries data store 140 (and more specifically, entity data store 144) for all sub-entities related to the observed entity. A determination of all sub-entities related to an observed entity may include a determination as to whether any sub-entities contain, or are contained by, yet other entities. The entity analytics system also can query data store 140 (and more specifically, entity data store 144) to determine all super-entities related to the observed entity. A determination of all super-entities related to an observed entity may include a determination as to whether any super-entities contain, or are contained by, yet other entities.

At step 420, the entity analytics system determines whether or not two entities are related to each other based on a number of matching sub-entities and/or super-entities. As discussed above, the entity analytics system determines that two entities are related to each other according to rules associated with an entity class definition stored in rules store 146. For example, if, based on the corresponding rule, the entity analytics system determines that two sub-entities refer to the same thing, the entity analytics system may increment a counter used to determine whether a first and a second entity is an exact match to each other (i.e., an "is a" relationship), an inexact match to each other (i.e., an "is related to a" relationship), or not related to each other. When the entity analytics system finishes an analysis of the sub-entities associated with a first and a second entity, the entity analytics system can use the counter to determine whether the first and second entities are related.

Continuing with the aforementioned example, if the counter is below a threshold, the entity analytics system may proceed to step 430, where the entity analytics system determines that no relationship exists. In some cases, the threshold value for determining that some sort of relationship exists between the first and the second entities may be set to a relatively low value.

Also in accordance with the aforementioned example, if the counter exceeds a threshold for determining that some sort of relationship exists between a first and a second entity, method 400 proceeds to step 440, where the entity analytics system determines whether the relationship is an exact match (i.e., an "is a" relationship) or an inexact match (i.e., an "is related to a" relationship). At step 440, if the counter value is less than a threshold amount for determining that a relationship is an exact match, method 400 proceeds to step 450, where the entity analytics system determines that the first and second entities have an "is related to a" relationship. Otherwise, method 400 proceeds to step 460, where the entity analytics system determines that the first and second entities have an "is a" relationship. Note that the use of a counter, in this context, is only an example and that the steps of method 400 may proceed according to a variety of prospective underlying implementations.

If the entity analytics system determines that some sort of relationship exists between a first and a second entity, method 400 may proceed from either step 450 or step 460 to step 470, where the entity analytics system resolves relationships between super-entities in which the first and second entities are sub-entities. As discussed above, the entity analytics system can determine that two super-entities refer to the same object based on the entity analytics system determining that associated sub-entities are identical; likewise, the entity analytics system can determine that two super-entities are related, but do not refer to the same object, based on the entity analytics system determining that the associated sub-entities also are related, but do not refer to the same object.

Figure 5:
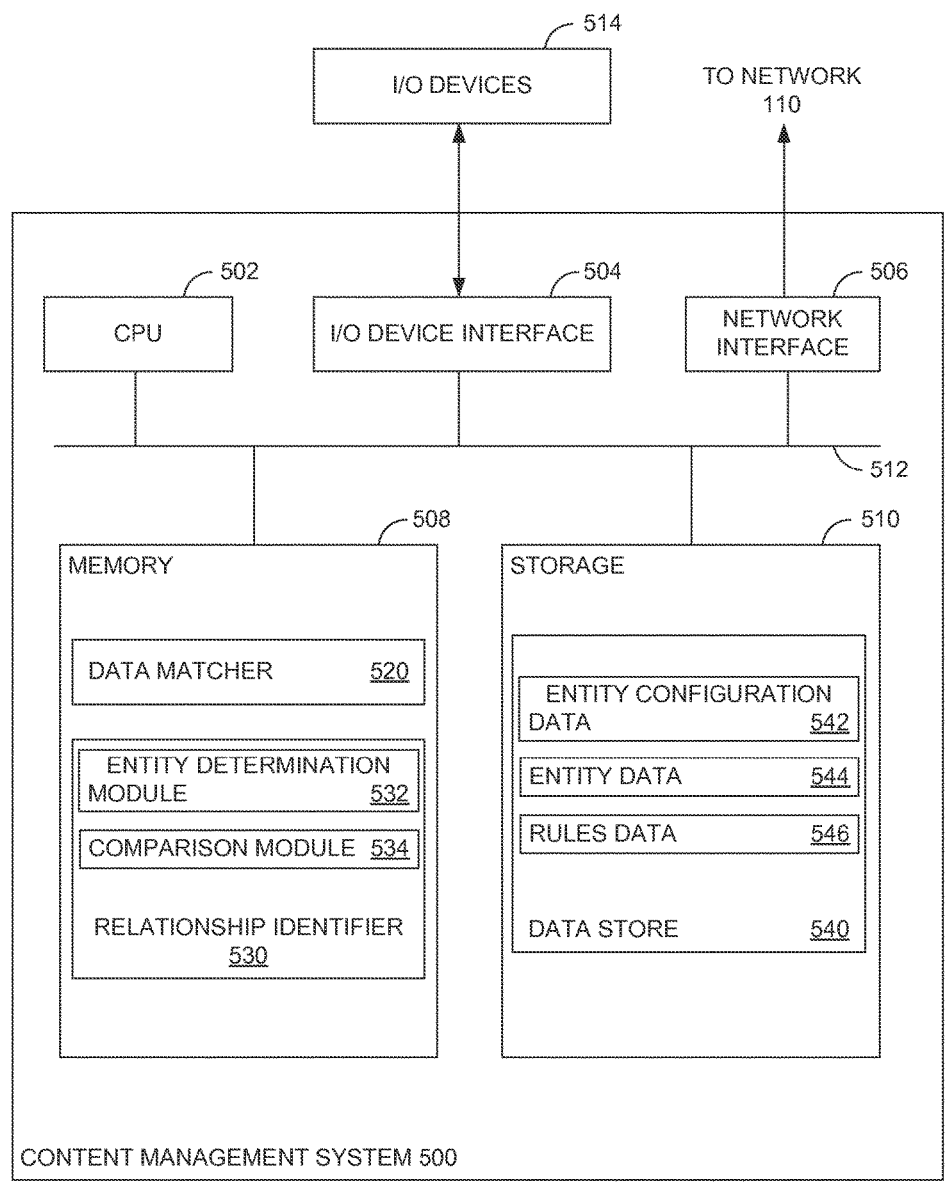
FIG. 5 illustrates an example entity analytics system that uses "has a" relationships between entities for entity resolution, according to one embodiment.

FIG. 5 illustrates an example entity analytics system 500 that uses "has a" relationships between entities to perform entity resolution, according to an embodiment. As shown, the entity analytics system includes, without limitation, a central processing unit 502, one or more I/O device interfaces 504, which may allow for the connection of various I/O devices 514 (e.g., keyboards, displays, mouse devices, pen input, etc.) to the entity analytics system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a data matcher 520 and a relationship identifier 530. Storage 510 includes a data store 540. As discussed above, data matcher 520 may be configured to monitor data store 540 for unanalyzed entities (i.e., inbound entities). When data matcher 520 detects an inbound entity, data matcher 520 may search for matching analyzed entities in data store 540 (and more specifically, entity data store 544). Data matcher 520 may provide the set of matching entities to relationship identifier 530 to determine relationships between the entities.

As shown, storage 510 includes a data store 540, which, in some embodiments, may be a relational database. Data store 540 includes entity configuration data store 542, entity data store 544, and rules store 546. As discussed above, entity configuration data store 542 contains entries that define an entity class and the possible sub-entities that members of the entity class can contain. Entity data store 544 contains information about the entities, and rules store 546 contains information used by the entity analytics system to determine whether two entities match (and, by extension, whether the parent entities have an "is a" or "is related to a" relationship).

Relationship identifier 530 may include an entity determination module 532 and a comparison module 534. As discussed above, entity determination module 532 may receive a set of entities from data matcher 520 and query data store 540 for all sub-entities and super-entities associated with each entity in the received set. Comparison module 534 may examine the retrieved sets of sub-entities and determine, based on matching rules associated with each entity class (stored in rule store 546), whether respective sub-entities of a first and a second entity from the set of entities match. Comparison module 534 may keep a running counter of the number of matching sub-entities between the first and second entities from the set, and when comparison module 534 is finished analyzing the respective sets of sub-entities, determine whether the first and second entities are unrelated, exact matches, or inexact matches. If comparison module 534 determines that the first and second entities are related to each other, comparison module 534 may proceed to determine relationships between the respective super-entities of which the first and second entities are sub-entities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD), a Blu-Ray disc, a memory stick, removable flash memory (e.g., portable Universal Serial Bus memory sticks, Compact Flash, Secure Digital, etc.), a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for determining relationships between entities in an entity analytics system including a processor and memory, comprising:
   specifying, by the entity analytics system, a plurality of entity classes, wherein entities of a first entity class can contain entities of at least a second entity class;
   specifying, by the entity analytics system, one or more features characterizing each of the plurality of entity classes, wherein at least one of the features indicates that entities of the second entity class can be included as a feature of entities of the first entity class;
   specifying, by the entity analytics system, at least a third entity class, wherein entities of the third entity class can be contained by entities of the first entity class;
   specifying, by the entity analytics system, one or more features characterizing the third entity class, wherein at least one of the features characterizing the third entity class indicates that entities of the third entity class can be included as a feature of entities of the first entity class;
   resolving, by the entity analytics system, two entities of the at least the second entity class as identical based on common features shared by the two entities, wherein resolving the two entities of at least the second entity class comprises determining that features of a first of the two entities are included as features of a second of the two entities according to data matching rules specifying a single interpretation of a plurality of data formats for each feature;
   based on the resolving, determining, by the entity analytics system, a relationship between at least two entities of the first entity class containing the resolved entity according to one or more entity resolution rules, wherein the entity resolution rules comprise at least:
      a first rule specifying that the at least two entities of the first entity class are identical, upon determining that features of the at least two entities are an exact match, and
      a second rule specifying that the at least two entities are related, but not identical, upon determining that a subset of features of the at least two entities match, and wherein the first and second rules specify a degree to which features are considered to be matching features;
   resolving, by the entity analytics system, two entities of the third entity class as being identical based on common features shared by the two entities of the third entity class; and
   resolving, by the entity analytics system, that at least two entities of the first entity class containing the resolved entities of the third entity class are identical.

2. The method of claim 1, further comprising:
   for the second entity class, specifying one or more rules for determining whether two entities of the second entity class are related entities.

3. The method of claim 2, wherein a first rule is used to determine whether two entities are identical and a second rule is used to determine whether two entities are related to each other but not identical.

4. The method of claim 2, wherein at least one of the rules comprises a numerical threshold of matching entities of the first and the at least the second entity classes.

5. The method of claim 2, wherein at least one of the rules comprises a plurality of conditions in which the two entities are to be considered related to one another.

6. A non-transitory computer-readable storage medium having computer readable program code embodied therewith, the computer readable program code configured to perform an operation for maintaining consistency in an entity analytics system, the operation comprising:
   specifying a plurality of entity classes, wherein entities of a first entity class can contain entities of at least a second entity class;
   specifying one or more features characterizing each of the plurality of entity classes, wherein at least one of the features indicates that entities of the second entity class can be included as features of entities of the first entity class;
   specifying at least a third entity class, wherein entities of the third entity class can be contained by entities of the first entity class;
   specifying one or more features characterizing the third entity class, wherein at least one of the features characterizing the third entity class indicates that entities of the third entity class can be included as a feature of entities of the first entity class;

resolving two entities of the at least the second entity class as identical based on common features shared by the two entities, wherein resolving the two entities of at least the second entity class comprises determining that features of a first of the two entities are included as features of a second of the two entities according to data matching rules specifying a single interpretation of a plurality of data formats for each feature;

based on the resolving, determining a relationship between at least two entities of the first entity class containing the resolved entity according to one or more entity resolution rules, wherein the entity resolution rules comprise at least:

a first rule specifying that the at least two entities of the first entity class are identical, upon determining that features of the at least two entities are an exact match, and a second rule specifying that the at least two entities are related, but not identical, upon determining that a subset of features of the at least two entities match, and wherein the first and second rules specify a degree to which features are considered to be matching features;

resolving two entities of the third entity class as being identical based on common features shared by the two entities of the third entity class; and resolving that at least two entities of the first entity class containing the resolved entities of the third entity class are identical.

7. The non-transitory computer-readable storage medium of claim 6, wherein the operations further comprise:

specifying at least a third entity class, wherein entities of the third entity class can be contained by entities of the first entity class; and specifying one or more features characterizing the third entity class, wherein at least one of the features characterizing the third entity class indicates that entities of the third entity class can be included as a feature of entities of the first entity class.

8. The non-transitory computer-readable storage medium of claim 7, wherein the operations further comprise:

resolving two entities of the third entity class as being the same entity based on common features shared by the two entities of the third entity class; and determining that at least two entities of the first entity class containing the resolved entities of the third entity class are identical.

9. The non-transitory computer-readable storage medium of claim 6, wherein the operations further comprise:

for the second entity class, specifying one or more rules for determining whether two entities of the second entity class are related entities.

10. The non-transitory computer-readable storage medium of claim 9, wherein a first rule is used to determine whether two entities are identical and a second rule is used to determine whether two entities are related to each other but not identical.

11. The non-transitory computer-readable storage medium of claim 9, wherein at least one of the rules comprises a plurality of conditions in which the two entities are to be considered related to one another.

12. A system comprising:
a processor; and
a memory storing one or more instructions, which, when executed by the processor, performs an operation for maintaining consistency in an entity analytics system, the operation comprising:

specifying a plurality of entity classes, wherein entities of a first entity class can contain entities of at least a second entity class;

specifying one or more features characterizing each of the plurality of entity classes, wherein at least one of the features indicates that entities of the second entity class can be included as a feature of entities of the first entity class;

specifying at least a third entity class, wherein entities of the third entity class can be contained by entities of the first entity class;

specifying one or more features characterizing the third entity class, wherein at least one of the features characterizing the third entity class indicates that entities of the third entity class can be included as a feature of entities of the first entity class;

resolving two entities of the at least the second entity class as identical based on common features shared by the two entities, wherein resolving the two entities of at least the second entity class comprises determining that features of a first of the two entities are included as features of a second of the two entities according to data matching rules specifying a single interpretation of a plurality of data formats for each feature;

based on the resolving, determining a relationship between at least two entities of the first entity class containing the resolved entity according to one or more entity resolution rules, wherein the entity resolution rules comprise at least:

a first rule specifying that the at least two entities of the first entity class are identical, upon determining that features of the at least two entities are an exact match, and a second rule specifying that the at least two entities are related, but not identical, upon determining that a subset of features of the at least two entities match, and wherein the first and second rules specify a degree to which features are considered to be matching features;

resolving two entities of the third entity class as being identical based on common features shared by the two entities of the third entity class; and resolving that at least two entities of the first entity class containing the resolved entities of the third entity class are identical.

13. The system of claim 12, wherein the operations further comprise:

specifying at least a third entity class, wherein entities of the third entity class can be contained by entities of the first entity class; and specifying one or more features characterizing the third entity class, wherein at least one of the features characterizing the third entity class indicates that entities of the third entity class can be included as a feature of entities of the first entity class.

14. The system of claim 13, wherein the operations further comprise:

resolving two entities of the third entity class as being identical based on common features shared by the two entities of the third entity class; and determining that at least two entities of the first entity class containing the resolved entities of the third entity class are identical.

15. The system of claim 12, wherein the operations further comprise:
for the second entity class, specifying one or more rules for determining whether two entities of the second entity class are related entities.

16. The system of claim 15, wherein a first rule is used to determine whether two entities are the same entity, and wherein a second rule is used to determine whether two entities are related to each other but not identical.

17. The system of claim 15, wherein at least one of the rules comprises a numerical threshold of matching entities of the first and the at least the second entity classes.

18. The system of claim 15, wherein at least one of the rules comprises a plurality of conditions in which the two entities are to be considered related to one another.

* * * * *